US010886971B1

United States Patent
Pleiter et al.

(10) Patent No.: US 10,886,971 B1
(45) Date of Patent: Jan. 5, 2021

(54) SYSTEM AND METHOD FOR ACCESS BROADBAND OVER POWER LINES (BPL) USING DOUBLE ALTERNATING CARRIER AND CHANNEL FREQUENCIES

(71) Applicant: Red Rock Telecommunications LLC, Phoenix, AZ (US)

(72) Inventors: Jack Oran Pleiter, Phoenix, AZ (US); Christopher Austin Pleiter, Phoenix, AZ (US); Lance Allen McGee, Highland, CA (US)

(73) Assignee: Red Rock Telecommunications, LLC, Phoenix, AZ (US)

( * ) Notice: Subject to any disclaimer, the term of this patent is extended or adjusted under 35 U.S.C. 154(b) by 0 days.

(21) Appl. No.: 16/834,702

(22) Filed: Mar. 30, 2020

(51) Int. Cl.
  *H04B 3/54* (2006.01)
  *H04B 3/56* (2006.01)
(52) U.S. Cl.
  CPC .............. *H04B 3/542* (2013.01); *H04B 3/56* (2013.01); *H04B 2203/5408* (2013.01); *H04B 2203/5466* (2013.01); *H04B 2203/5483* (2013.01)
(58) Field of Classification Search
  CPC .. H04B 3/542; H04B 3/56; H04B 2203/5408; H04B 2203/5466; H04B 2203/5483
  See application file for complete search history.

(56) References Cited

U.S. PATENT DOCUMENTS

| 5,828,293 | A | 10/1998 | Rickard |
| 6,933,835 | B2 | 8/2005 | Kline |
| 7,307,511 | B2 | 12/2007 | Kline |
| 7,349,325 | B2 | 3/2008 | Trzeciak et al. |
| 7,492,245 | B2 | 2/2009 | Renz et al. |
| 7,671,701 | B2 | 3/2010 | Radtke |
| 7,773,361 | B2 * | 8/2010 | Davidow ............... H04B 3/542 361/118 |
| 7,795,994 | B2 | 9/2010 | Radtke |
| 7,876,174 | B2 | 1/2011 | Radtke |
| 9,674,711 | B2 | 6/2017 | Bennett et al. |

(Continued)

OTHER PUBLICATIONS

G. Jee, C. Edison, R. Das Rao and Y. Cern, "Demonstration of the technical viability of PLC systems on medium- and low-voltage lines in the United States," in IEEE Communications Magazine, vol. 41, No. 5, pp. 108-112, May 2003, doi: 10.1109/MCOM.2003. 1200109. (Year: 2003).*

(Continued)

*Primary Examiner* — Jaison Joseph
(74) *Attorney, Agent, or Firm* — Schwegman Lundberg & Woessner, P.A.

(57) ABSTRACT

A double alternating frequency algorithm (DAFA) uses a high frequency carrier wave (>1 GHz) that lies above environmental noise and is capable of carrying large amounts of data, stacks a plurality of N frequency channels on the carrier wave (e.g., one channel for each transformer serviced by a substation) and changes the frequency of the carrier wave at each transformer to repeat the data for downstream and upstream propagation for providing broadband Internet over power lines. This approach will fulfill the promise of broadband Internet to the vast rural areas of the United States that do not have access to broadband Internet. Furthermore, this approach will provide another revenue source for utility companies to leverage the existing power distribution system.

31 Claims, 8 Drawing Sheets

(56) References Cited

U.S. PATENT DOCUMENTS

2011/0270454 A1 11/2011 Kreiss et al.
2014/0146898 A1 5/2014 Hallas

OTHER PUBLICATIONS

C. M. Arteaga and Y. J. Yang, "Large scale broadband over powerline field trial on medium voltage overhead circuits," 2008 IEEE International Symposium on Power Line Communications and Its Applications, Jeju City, 2008, pp. 289-292, doi: 10.1109/ISPLC.2008.4510441. (Year: 2008).*
N. Weling, A. Engelen and S. Thiel, "Broadband MIMO powerline channel emulator," 18th IEEE International Symposium on Power Line Communications and Its Applications, Glasgow, 2014, pp. 105-110, doi: 10.1109/ISPLC.2014.6812347. (Year: 2014).*
Whatever happened to Broadband over Power Line?, E & T Magazine, http://eandt.thelet.org/magazine/2013/10/broadband-over-power-line.ctm, accessed Jul. 19, 2016.

* cited by examiner

SYSTEM AND METHOD FOR ACCESS BROADBAND OVER POWER LINES (BPL) USING DOUBLE ALTERNATING CARRIER AND CHANNEL FREQUENCIES

BACKGROUND OF THE INVENTION

Field of the Invention

This invention relates to access broadband over power lines (BPL) and more particularly to a system and method that implements a double alternating frequency algorithm (DAFA) in which carrier wave and channel frequencies are alternated at each transformer to overcome the challenges of BPL and provide broadband Internet over power lines.

Description of the Related Art

High speed data communications e.g., broadband Internet, is delivered to most commercial and residential customers over fiber optic cables. The deployment of fiber optic cable is expensive, typically limited to high density metropolitan and suburban areas. Vast rural areas do not have access to broadband Internet. Customers are limited to narrowband Internet services provided over the telephone system.

Reliable and affordable high-speed Internet e-Connectivity, or electronic connectivity, is fundamental for economic activity throughout the US. Access to high-speed Internet is vital for a diverse set of industries, including agricultural production, manufacturing, mining, and forestry and acts as a catalyst for rural prosperity by enabling efficient, modern communications between rural American households, schools, and healthcare centers as well as markets and customers around the world. This is why the Agriculture and Rural Prosperity Task Force recommended e-Connectivity for all rural Americans because it is a modern-day necessity—not simply an amenity—in today's information-driven global economy. Unfortunately, 80 percent of the 24 million American households that do not have reliable, affordable high-speed Internet are in rural areas.

In the early to mid 2000s, access broadband over power lines (BPL) was touted as the answer to the rural broadband problem. The existing power distribution system (PDS) would be used to transport data on frequencies which are part of the radio spectrum allocated to over-the-air communication services to power outlets in the home or commercial building. An Ethernet adapter would be plugged into the power outlet to distribute broadband Internet throughout. Access BPL would also offer another income stream for utilities to leverage their existing infrastructure and compete with more traditional Internet companies.

Medium voltage (MV) power lines carry generally up to a few tens of kilovolts, over a few kilometers between the electricity distribution substations and pole-mounted transformers. Medium voltage power lines typically include 1, 2 or 3 power conductors that carry power from a substation to a number of homes or business. Three-phase power delivered on three power conductors being quite common. The medium voltage power lines may also include a neutral conductor that provides a return path for current back to the power source at the substation, which assists with overall power management. Low voltage lines include conductors that transmit a few hundred volts over a few hundreds of meters, usually from pole-mounted transformers into a home or business. Typically, data signals are embedded onto one of the MV conductors at the substation. The low-power data signals cannot pass through the pole-mounted transformer. A power line "coupler" provides a path from the conductor around the transformer to a "modem," which extracts the data signals and converts them to a distribution protocol. The data signals are then sent down the LV lines to the group of buildings. Repeaters may be used to take in the data and amplify it to reach the next pole-mounted transformer. The modems in theory transmit in the medium and high frequency bands (1.6 MHz to 80 MHz carrier). However, most equipment was built to operate between 1.7 MHz and 30 MHz. Utility companies reserved lower frequencies for their own purposes such as to monitor the performance of the power grid.

Most utilities used Orthogonal Frequency Division Multiplexing (OFDM)—a method of encoding digital data on multiple carrier frequencies—to split radio signals into multiple, smaller sub-signals which are then transmitted at different frequencies. Other signal formats such as Code Division Multiple Access (CDMA), Time Division Multiple Access (TDMA) or Frequency Division Multiple Access (FDM) to name a few may be employed. Early iterations of access BPL used a collision-based approach based on thin Ethernet networks or a "thinnet" to communicate. Later versions moved to switch based systems.

Trials of access BPL technology to date have been prolific and widespread. They have spanned everywhere from the UK and most European countries to the US, Australia, Egypt, Ghana, India. Indonesia, Malaysia, the Philippines, Saudi Arabia and South Africa—to name but a few global instances. Despite all these initiatives, all the trials appear to have resulted in power companies and/or Internet service providers deciding that the technology is not viable as a means of delivering broadband Internet access. This is because of two technological challenges that have impeded progress: limited reach and low bandwidth, which do not come close to matching Asymmetric Digital Subscriber Line (ADSL), Wi-Fi and even 3G mobile broadband services that have steadily expanded their own coverage areas over time. "They just could not get the speed, and the further they want to reach, the bigger the speed challenge becomes." says Don Beattie, director of the Radio Society of Great Britain (RSGB). One of the world's most ambitious BPL companies, International Broadband Electrical Communications (IBEC) in the US, ceased trading in January 2012, encouraging its existing customers to pursue other options for their Internet service as soon as possible. "Whatever happened to Broadband over Power Line?" E & T Magazine, 2013.

Since this obituary in 2013, little if anything has been done or changed with regards to the prospects of successful deployment of access BPL. As of Feb. 17, 2020, the Wikipedia cite for "Broadband over power lines" states "There have been many attempts worldwide to implement access BPL, all which have indicated that BPL is not viable as a means of delivering broadband Internet access." If access BPL is to ever be deployed, a new approach will be required to overcome the seemingly insurmountable problems.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for implementing a double alternating frequency algorithm (DAFA) for access BPL communications over a power distribution system that uses a high frequency carrier wave (>1 GHz) that lies above environmental noise and is capable of carrying large amounts of data, stacks a plurality of N channels on the carrier wave (e.g., one channel for each transformer serviced by a substation) and changes the frequency of the carrier wave at each transformer to repeat the data for downstream and upstream propagation.

In an embodiment, a system that implements the DAFA in which a substation provides power to N transformers via medium voltage lines (e.g. one or more power conductors and possibly a neutral conductor) and each transformer provides power to customer residences over low voltage lines, generates data packets in a plurality of N frequency channels contained in a carrier wave at a carrier frequency of at least 1 GHz propagating on the medium voltage power line from the substation. At each successive transformer, one or more broadband power line couplers are configured to extract and inject broadband data signals spanning a bandwidth of at least 1 GHz from and to the medium voltage power line via one of the conductors. A modem, connected to the one or more couplers, is configured to extract the carrier wave at the carrier frequency from the immediately preceding transformer, and extract and process a designated frequency channel from the extracted carrier wave to convert data signals to a distribution protocol that is coupled to the low voltage power lines and provided to the customer residences to bypass the transformer. The modem is configured to repeat at least one of the unprocessed frequency channels on a carrier wave at a carrier frequency of at least 1 GHz, and different than at least the X previous carrier frequencies, that is injected via the one or more couplers back onto the medium voltage power line via one of the conductors to propagate downstream to the next transformer. The modem repeats the data signals on the carrier wave at a power level sufficient to reach the next transformer but not more than the next Y transformers where Y<=X so that each carrier frequency can dissipate in a natural progression before being reused.

In an embodiment, the modem is configured to select a carrier frequency from X different carrier frequencies where X<N/2 such that each of the X carrier frequencies is reused at least once to service the N transformers.

In an embodiment, the N frequency channels occupy slices of the carrier wave from baseband upward to approximately the lowest carrier frequency of the X available carrier frequencies.

In an embodiment, the N frequency channels are partitioned to include a first portion for downstream propagation and a second portion for upstream propagation. In a routed network, only the unprocessed frequency channels are repeated to propagate downstream. In a switched network, all of the frequency channels are repeated to propagate downstream.

In an embodiment, each frequency channel has a bandwidth of at least 40 MHz.

In an embodiment, the carrier frequency is at least 1.5 GHz and each frequency channel has a bandwidth of at least 80 MHz.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a new and viable approach for providing broadband Internet over power lines that overcomes the problems of limited bandwidth, reach and noise. A double alternating frequency algorithm (DAFA) uses a high frequency carrier wave (>1 GHz) that lies above environmental noise and is capable of carrying large amounts of data, stacks a plurality of N channels on the carrier wave (e.g., one channel for each transformer serviced by a substation) and changes the frequency of the carrier wave at each transformer to repeat the data for downstream and upstream propagation. This approach will fulfill the promise of broadband Internet to the vast rural areas of the United States that do not have access to broadband Internet. Furthermore, this approach will provide another revenue source for utility companies to leverage the existing power distribution system.

Figure 1:
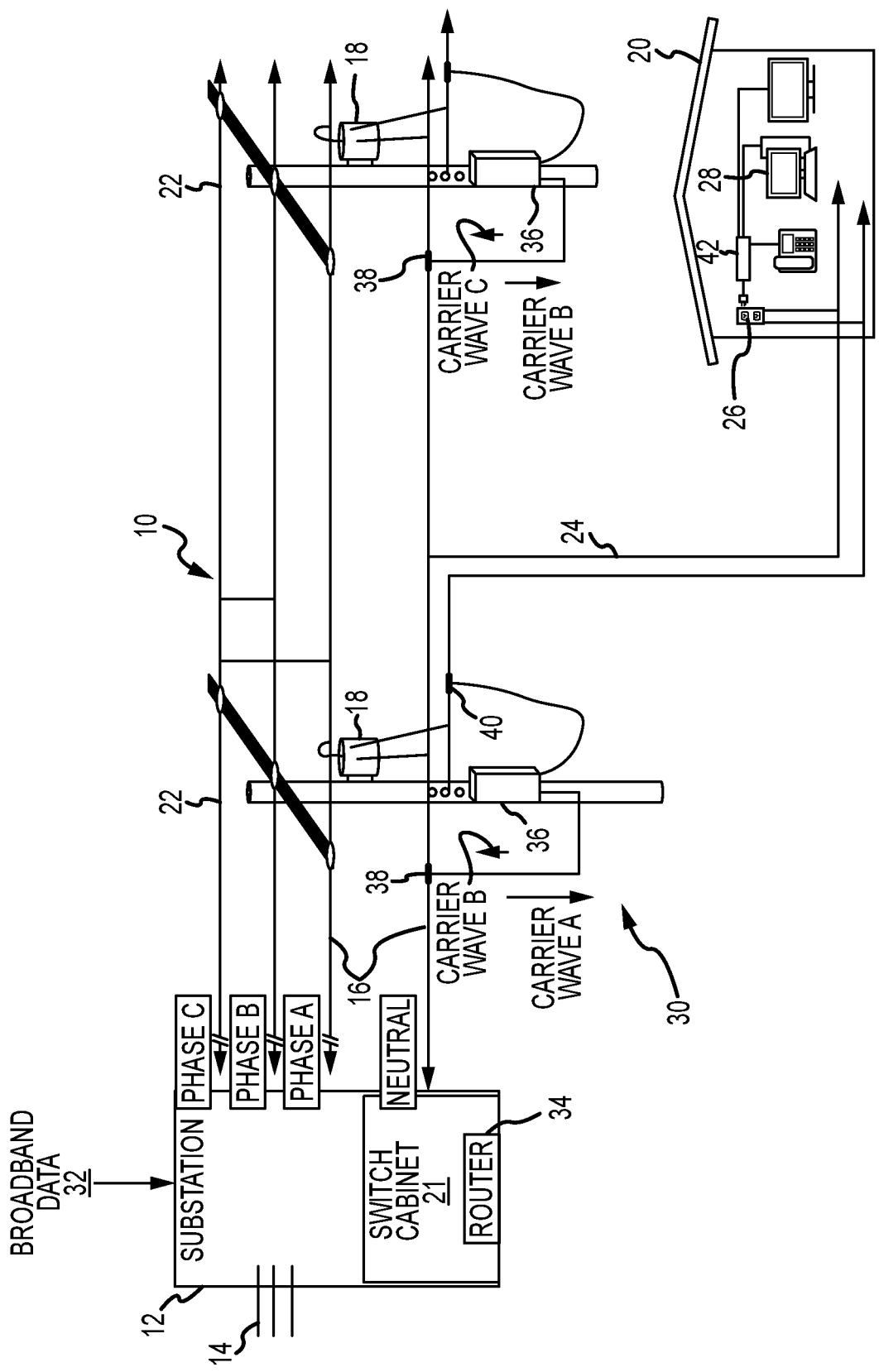
FIG. 1 is a diagram of an embodiment for implementation of the DAFA for access BPL communications over a power distribution system.

Referring now to FIG. 1, an embodiment of a power distribution system 10 includes a substation 12 that receives power from high voltage power lines 14 and distributes the power on medium voltage power lines 16, which includes three power conductors (Phase A, Phase B and Phase C) to deliver three-phase power to N distribution or service transformers 18 (herein referred to as "nodes") and a neutral conductor that acts as a return path. A typical substation may deliver power on average to N=18 transformers. Each transformer services on average 4.6 customers 20 e.g., commercial buildings or residences.

A typical substation 12 will include a switch cabinet 21, which is a separate metal compartment where all electrical components including the incoming bus, outgoing bus, instrumentation and main circuit breaker or switch, are enclosed. The electrical components within the cabinet are used to de-energize the medium voltage power line to allow for work to be done and to clear faults downstream from the cabinet. It is critical for transmission of power from the overhead or underground transmission lines.

In an "overhead" power line system, power poles 22 made of either wood, metal or concrete support overhead power lines 18 and other permitted cables; for example, fiber optic cable. A power pole keeps the power lines 18 insulated from the ground and out of the way from people and vehicles. The medium voltage power line 16 is an electrical wire, cable or conduit used to carry electricity from a substation to the consumer. In this embodiment, a "3 phase" system is implemented, which allows more power to be sent across the power line. 3-phase power is the same for each oscillation but offset phase 120 degrees from each other.

The distribution or service transformer 18 is a device that provides the final voltage transformation in the electric power distribution system, reducing the voltage used in the medium voltage distribution lines in the range of 11,000 to 33,000 volts to the level used by the customer in the 120/240 volt range on low voltage lines 24. If mounted on a utility pole, they are called pole-mount transformers. If the distribution lines are located at ground level or underground, distribution transformers are mounted on pads and locked in steel cases, thus known as distribution tap pad-mount transformers.

The low voltage lines 24 terminate in multiple electrical receptacles (wall outlets) 26 inside each building or residence 20. The electric receptacle is an opening or series of openings usually known as a socket that connects an electrical device 28 such as a TV, computer, phone, etc., to an electricity supply. In buildings, electrical outlets are usually installed in the wall although they can also be installed in the floor, ceiling or other locations as needed.

To implement a BPL system 30, broadband data signals 32 injected at substation 12 must propagate downstream (and back upstream) on the medium voltage power lines 16 (e.g., one of the power conductors or neutral conductor) bypassing the distribution transformers 18, which act as an RF block, to travel on low voltage power lines 24 to reach the customers.

A router 34, typically located in switch cabinet 21 at substation 12, is a networking device that forwards data packets between computer networks. Routers perform the traffic directing functions on the Internet. When a data packet comes in on one of the lines, the router reads the network address information in the packet to determine the ultimate destination. Then, using information in its routing table or routing policy, it directs the packet to the next network on its journey. The router maintains routing tables of every BPL modem 36 at each node 18 and every local end user customer connected to those BPL modems. In doing so the network will be able to route traffic to and from the end user customers network.

In general, the substation modem transmits the data packets at RF frequencies down one of the medium voltage power lines 16. Alternately, the data packets could be injected at any point along the MV power lines. In this example, the data packets are injected on the neutral conductor but in general any MV power conductor or the neutral conductor is viable. A broadband MV line coupler 38 at each node provides an electrically non-conductive path, which does not pass significant amounts of power, to couple the RF frequencies to the BPL modem 36, which performs multiple functions. The broadband MV line coupler may include, for example, a current transformer, an inductor, a capacitor, an antenna, and the like. In an overhead power line system, the power line coupler is capacitive. In an underground system, the broadband MV line coupler is inductive. The modem modulates a carrier wave to encode digital information for transmission and demodulates signals to decode the transmitted information to transmit data between computers. The goal is to produce a signal that can be transmitted easily and decoded to reproduce the original digital data. In this example, BPL modem 36 is bi-directional; capable of both extracting and injecting broadband RF signals from and to the MV conductor. In other configurations, separate modems may be used to extract or inject data signals.

The modem demodulates incoming data signals to extract the data packets for the local end user customer for that node, converts the data packets to a distribution protocol, routes them to a LV line coupler 40 that couples the data packets to one of the conductors for the low voltage power lines 24, which carries the data to an electrical receptacle 26. A power line adapter 42 such as Home Plug® is plugged into electrical receptacle 26 to extend an Ethernet network or Universal Serial Bus (USB) connection to another room in the home using AC wall outlet and the buildings electrical system. This may be done via a wired or wireless network.

The modem also repeats (or rebroadcasts) data packets intended for local end user customers at nodes downstream of the current node or intended for the substation upstream of the current node. Broadband MV line coupler 38 injects the data packets back onto the neutral conductor. The modem will also receive data packets modified by its local end user customers and transmit the data packets either downstream or upstream. In a routed network, only the unprocessed data packets are repeated to propagate downstream. In a switched network, all of the data packets are repeated to propagate downstream. In both networks, all data packets propagating upstream are repeated.

The Double Alternating Frequency Algorithm or DAFA represents the method in which at each node (transformer/modem) the carrier frequency of a carrier wave that contains N frequency channels of data packets is alternated to repeat the carrier wave and the frequency channels to avoid interference between data packets as they propagate upstream and downstream and the frequency channel assigned to the node is alternated to provide broadband Internet to local end user customers serviced by each node.

Figure 2A:
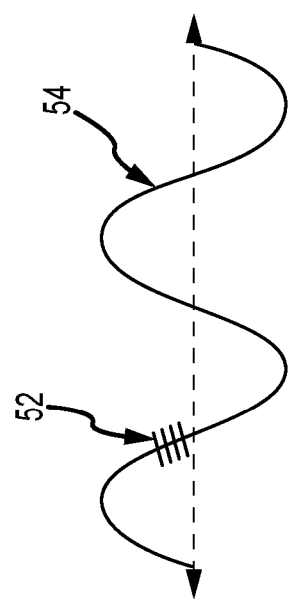
FIGS. 2a and 2b are diagrams illustrating an embodiment for stacking of N frequency channels on a carrier wave from baseband up to the carrier frequency.
Figure 2B:
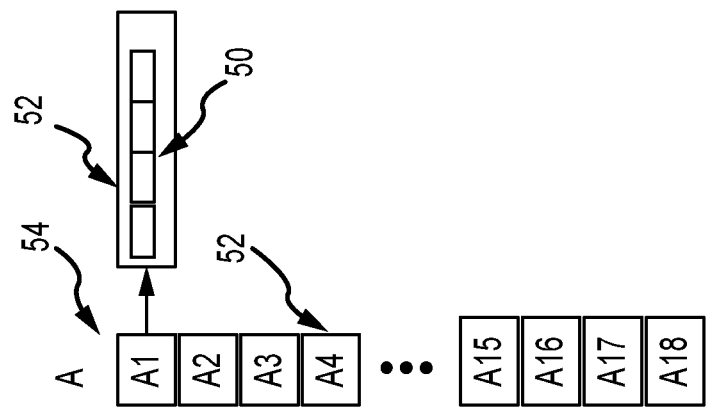
Figure 3:
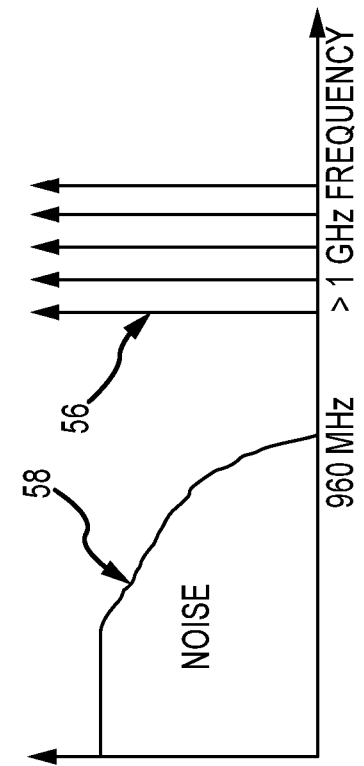
FIG. 3 is a diagram illustrating the position of the carrier frequency above the environmental noise sources.

Referring now to FIGS. 1 through 3, to implement the DAFA to overcome the problems of limited bandwidth to the local end user customers, noise and the ability to reach all N transformers, broadband data 32 is provided in data packets 50 in a plurality of N frequency channels 52 contained in a carrier wave 54 at a carrier frequency 56 of at least 1 GHz above noise 58 propagating on the medium voltage power lines 16. Suitably, the data packets for the $1^{st}$ transformer are placed in CH1, the data packets for the $2^{nd}$ transformer are placed in CH2 and so forth. Broadband MV line coupler 38 extracts and injects broadband data signals from baseband up to at least the carrier frequency from and to the medium voltage power lines via the specified conductor. Modem 36 includes a receiver, a repeater and a transmitter. The modem's receiver is configured to extract the carrier wave 54 at the carrier frequency 56 (e.g. Carrier A) from the immediately preceding transformer/modem, extract and process a designated frequency channel 52 (e.g. Channel A1) from the extracted carrier wave to convert data signals to a distribution protocol that is coupled to the low voltage power lines 24 and provided to the customer residences 20.

The modem's repeater is configured to repeat at least one of the unprocessed frequency channels 52 on a carrier wave 54 at a carrier frequency 56 of at least 1 GHz and different than at least the X previous carrier frequencies that is injected via the broadband MV line couplers back 38 onto the medium voltage power line 16 to propagate downstream to the next transformer 18. More typically, the modem will repeat at least all of the unprocessed frequency channels, and in some cases all of the frequency channels, to propagate downstream to the remain nodes. Similarly, the modem can repeat frequency channels traveling upstream onto a different carrier frequency. The modem's transmitter is configured to transmit local modifications to data packets in a designated channel either upstream or downstream on the designated carrier frequency.

Figure 4:
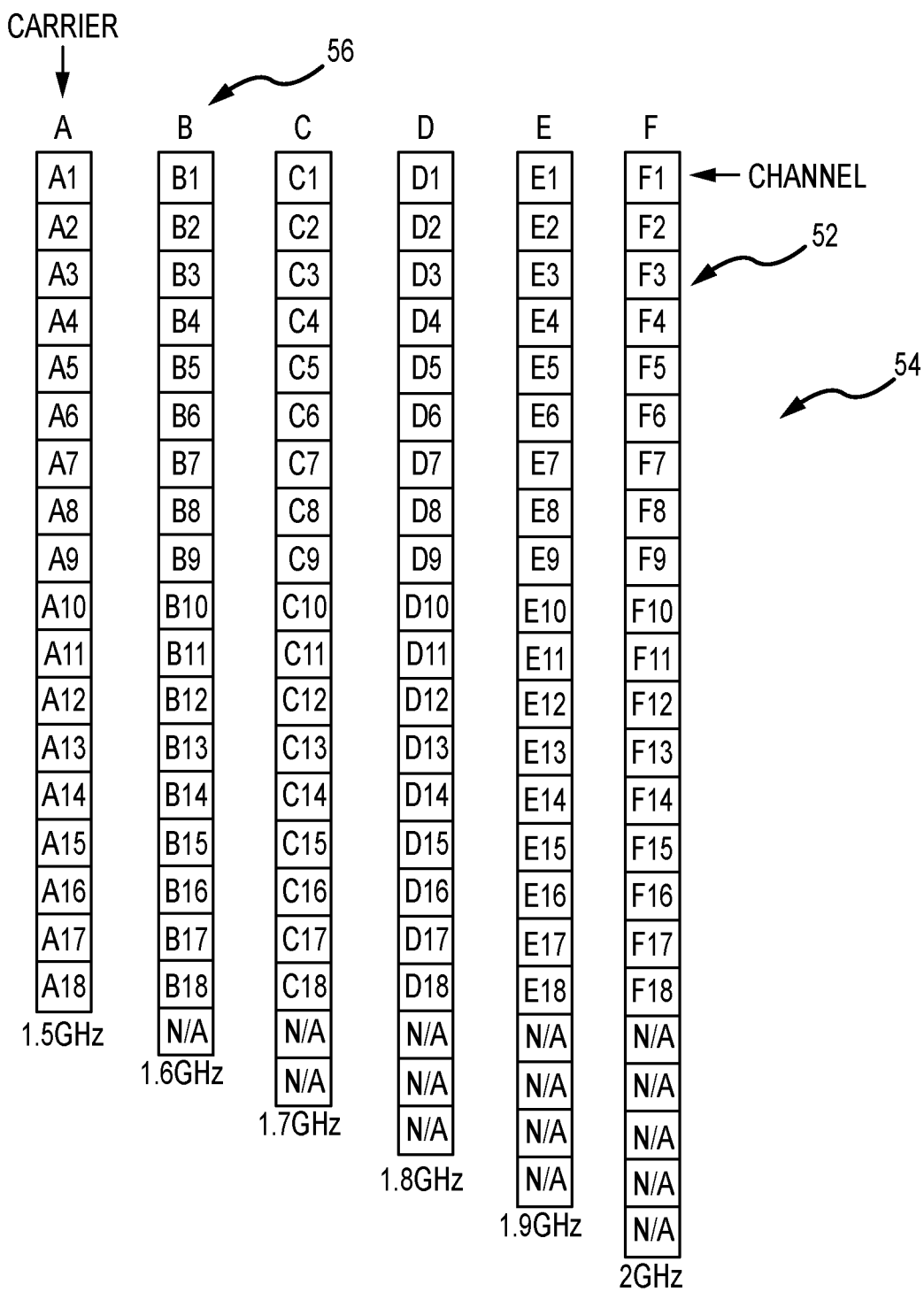
FIG. 4 is a diagram of an embodiment of the DAFA in which the carrier frequency for the carrier wave alternates and repeats carrier frequencies A-F over a spectral distribution of 1.5 GHz to 2 GHz.

As shown in FIG. 4, each successive carrier wave 54 resides at a different carrier frequency 56 (e.g., carrier frequencies A, B, C, D, E, and F) of at least 1 GHz, which lies above environmental noise. Because each successive modem is tuned to the previous carrier frequency, the various carrier waves propagating up and downstream on the medium voltage power lines do not interfere and BPL can reach each of the nodes. Because each node is assigned its own frequency channel (e.g., channels A1, A2, A3, etc.) and each of these frequency channels can support broadband communications e.g., >40 MHz and preferably >80 MHz, broadband Internet can be effectively provided to the local end user consumers at each node. Consumers at the end of the line should receive the same quality of service as consumers at the beginning of the line.

In an exemplary case, a typical substation may service N=18 nodes or transformers, each in turn servicing on average 4.6 customers. The frequency channels are stacked from baseband (0 Hz) up towards the carrier frequency. Assuming an 80 MHz bandwidth with 18 channels that equates to approximately 1.44 GHz. The 18 channels can be stacked on a carrier wave at a 1.5 GHz carrier frequency. Each successive carrier frequency is stepped up, in this example, by 0.1 GHz. The step-size is dictated by the capabilities of the receiver in the modem. The additional bandwidth in the carrier frequencies is unused or reserved for other network functions. Higher carrier frequencies can be employed to support more and/or larger bandwidth frequency channels.

Figure 5:
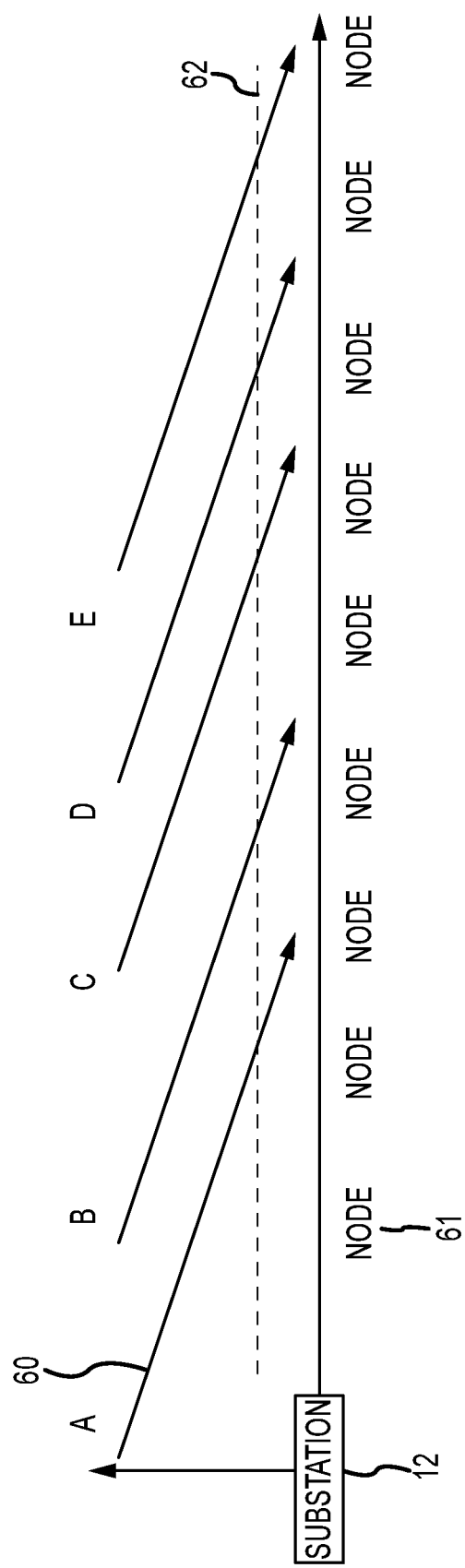
FIG. 5 is a diagram of an embodiment in which the sub-station and each successive modem broadcasts the carrier wave at a power level sufficient to reach the next modem (transformer) but no more than Y modems (transformers) where Y is less than or equal to the number of different carrier frequencies X.

DAFA could utilize N different carrier frequencies to service the N nodes but this is unnecessary. A subset of X carrier frequencies where 2<=X<=N can be used to service the network. As shown in FIG. 5, the substation 12 and each successive modem 36 transmits ("repeats") the data signals on a carrier wave at the carrier frequencies A, B, C, D, . . . at a power level 60 sufficient to reach the next node 61 (transformer 18/modem 36) but not more than the next Y nodes where Y<=X and X and Y are both integers. If X<=N/2 then each carrier frequency is reused at least once. The carrier wave at a given carrier frequency is said to "reach" a transformer if the detected power level exceeds a detection threshold 62. For example, N=18 transformers, X=6 different carrier frequencies A-F and Y=3, a carrier wave at a given carrier frequency will reach the next 3 transforms and be recycled every 6 transformers. The benefits to using a subset of carrier frequencies that are recycled is found in the reduced cost of the broadband power line couplers and the modem receiver, which have to span a smaller bandwidth.

Figure 6:
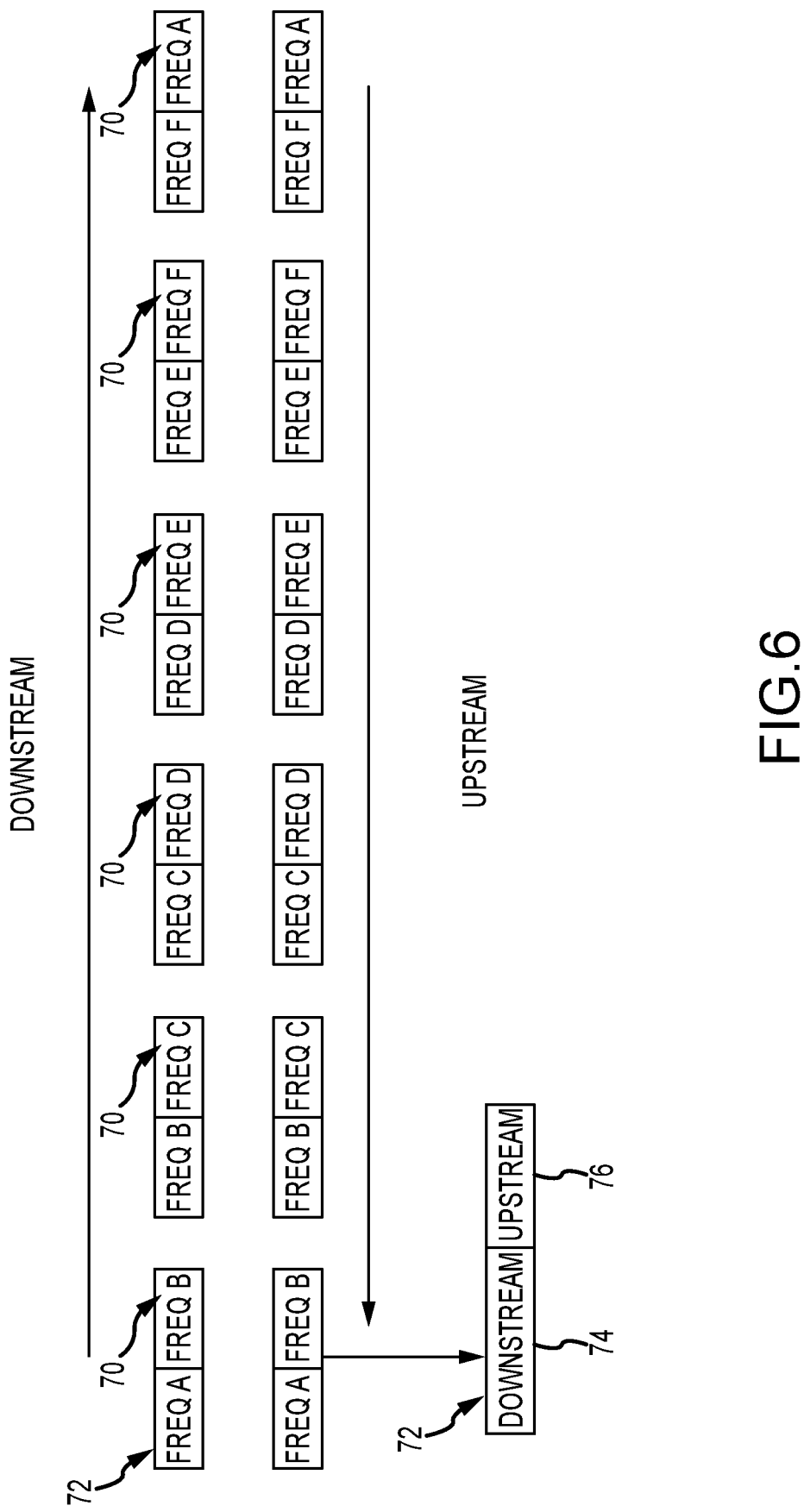
FIG. 6 is a diagram illustrating an embodiment for both downstream and upstream communication of data using the DAFA in which each frequency channel is partition for downstream and upstream communication.

Referring now to FIG. 6, the DAFA supports both downstream and upstream communication of data packets among the N nodes 70. Each frequency channel 72 is partitioned to provide a portion 74 for data packets moving downstream and a portion 76 for data packets moving upstream. The partition could be 50/50 but typically more bandwidth is allocated for downstream communication. For example, data flowing downstream is received at the first modem on carrier frequency A and repeated downstream on carrier frequency B to the second modem that receives data on carrier frequency B and repeats the data on carrier frequency C and so forth.

In a routed network, only the unprocessed frequency channels 72 are repeated to propagate downstream. Each node is assigned a specific frequency channel. Once that node has processed the data in that channel there is no need to transmit it downstream. Any modifications to the data made by the local end user customers are transmitted upstream to the substation. The changes are incorporated and then transmitted back downstream in the various frequency channels as required. In a switched network, all of the frequency channels are repeated to propagate downstream. Although each node has an assigned frequency channel, the node may be directed by the routing table to extract data from other frequency channels as well. Any modifications to the data made by the local end user customers may be transmitted either downstream or upstream to the various nodes and the substation.

Figure 7:
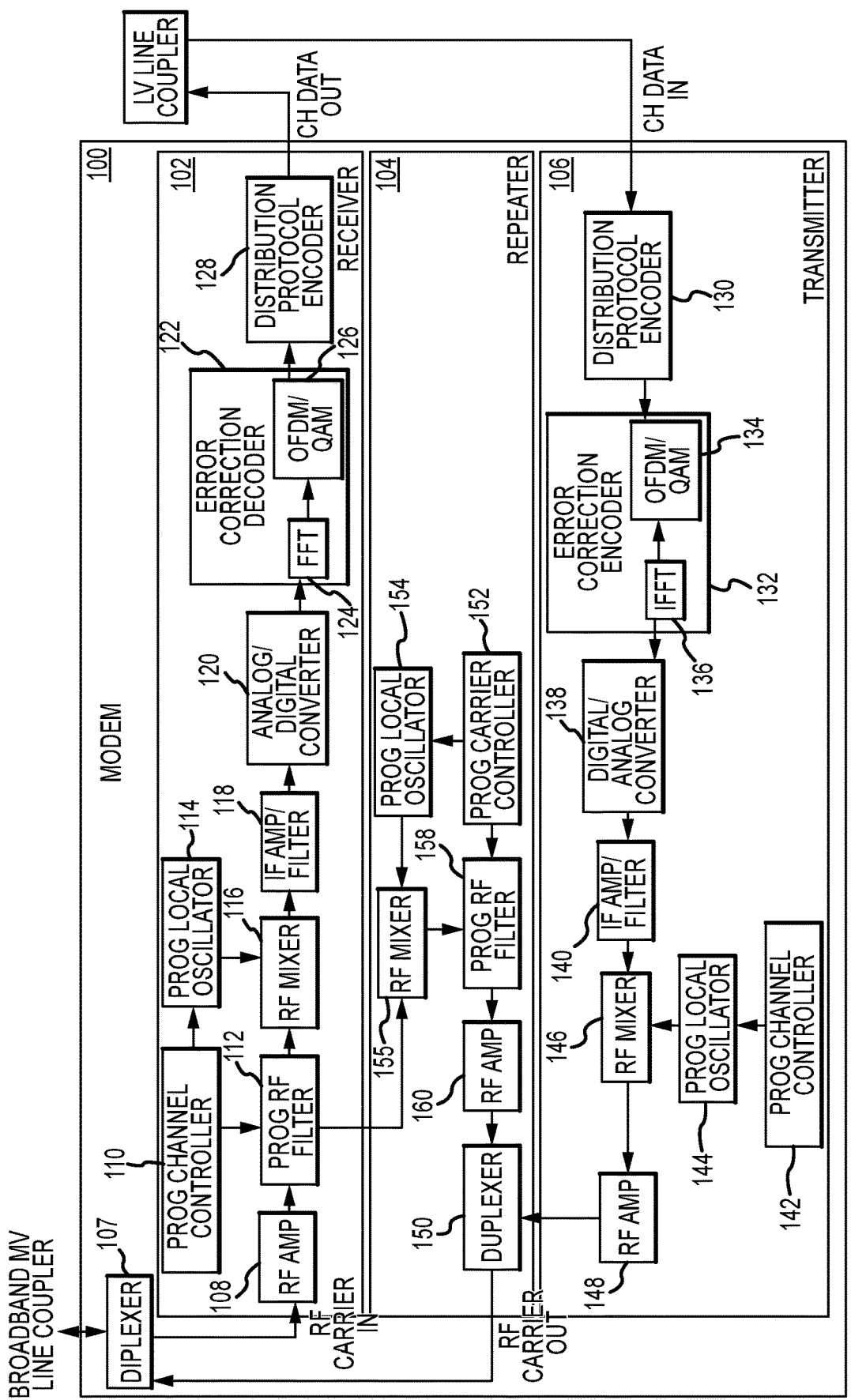
FIG. 7 is a block diagram of an embodiment of the modem placed at each transformer to extract data packets from the assigned frequency channels for the customer residences, to repeat at least the unprocessed frequency channels on a carrier wave at a different carrier frequency and to transmit modifications to the local frequency channel.

Referring now to FIG. 7, an embodiment of a modem 100 comprises a receiver 102, a repeater 104 and a transmitter 106. The digital portions of the modem may, for example, be implemented with one or more digital signal processing (DSP) chips. There is a succession of modems on the MV power lines, each modem being capable of receiving carrier waves at all carrier frequencies and able to select a specific frequency channel on each carrier. Each modem is also able to transmit simultaneously, upstream or downstream, on a different carrier frequency than is being received, on one or more specific transmit channels. Although the Modem is capable of receiving all Carriers and Channels, only the Carrier of interest will be extracted. The Channel of interest will be extracted from that Carrier, processed and sent to the user(s) as TCP/IP data. Returning TCP/IP data will be processed, modulated onto an upconverted Carrier, and sent, along with the upconverted Carrier of interest, to the line to be processed by the next modem. The Modem is unconcerned with any other carriers other than the Carrier of interest.

Receiver 102 receives broadband RF signals via a broadband MV line coupler and diplexer 107, which uses low-pass and high-pass filters to isolate the incoming carrier wave from the outgoing carrier wave at different carrier frequencies. The broadband RF signals may include one or more carrier waves at different carrier frequencies as well as environmental noise. The data packets that occupy a given frequency channel are encoded in a layer 3 protocol such as TCP/IP. Generally speaking, the receiver selects a specific carrier frequency assigned to that modem and demodulates the channel assigned to that node. The receiver converts the analog signal to digital, processes the signal for error detection and correction and then encodes the signal to a distribution protocol (e.g., layer 2 Media Access Control (MAC) protocol) that is output to the power line coupler for distribution to the end users.

In an embodiment, a broadband RF amplifier 108 amplifies the broadband RF signals. A Programmable Channel Controller 110 selects one Carrier N and one Channel N through instructions sent to a Programmable RF Filter 112 and a Programmable Local Oscillator 114. Instructions may be pre-programmed or sent dynamically via a dedicated management channel to the Controller. RF Filter 112 is tuned to the specific carrier frequency so that only the assigned carrier wave is passed. Local Oscillator 114 generates a local oscillator signal at the selected channel frequency. An RF mixer 116 mixes the carrier wave at the selected carrier frequency with the local oscillator signal to extract the frequency channel and demodulate it to a baseband channel, which is separated from the carrier at this point. The baseband channel is processed by an intermediate (IF) amplifier/filter 118. The amplified output is converted to unprocessed digital data by an Analog to Digital Converter 120. An error correction decoder 122, suitably implemented with a Fast Fourier Transform (FFT) 124 and OFDM/QAM (Orthogonal Frequency Division Multiplexing/Quadrature Amplitude Modulation) 126, processes the digital data for error detection and correction. A distribution protocol encoder 128 converts the digital data to any of several distribution protocols (e.g., HomePlug®, IEEE 1901, IEEE-802.11b, g, n, ax, etc.), which is output to the LV power line coupler for distribution to the end users.

Transmitter 106 receives modifications to the data packets in the distribution protocol from end users via the LV power line coupler. Generally speaking, the transmitter decodes the distribution protocol and decodes the error correction codes to produce digital data. The digital data is converted to analog, amplified and then modulated to a specified channel frequency and then onto a specified carrier frequency for insertion back onto the MV power line via the broadband MV line coupler for propagation upstream or downstream.

In an embodiment, a distribution protocol decoder 130 and an error correction encoder 132, suitable OFDM/QAM 134 and an Inverse FFFT (IFFT) 136, encode the incoming data packets to the layer 3 TCP/IP protocol. A digital to analog converter 138 converts the digital data to a baseband analog RF signal, which is then passed through an IF amplifier/filter 140. The baseband RF signal is identical in width and frequency to the original separated channel. A programmable channel controller 142 selects a carrier frequency (different than the incoming carrier frequency processed by the Receiver) and a channel frequency (e.g. the assigned channel frequency for the modem or node or possibly a different channel frequency) to control a programmable local oscillator 144. An RF mixer 146 mixes the baseband analog RF signal (containing the TCP/IP data packets) with a local oscillator signal representative of the specified frequency channel on the specified carrier frequency to form a carrier wave. A broadband RF amplifier 148 amplifies the carrier wave and directs it back to diplexer 107. A duplexer 150 combines this carrier wave with the output (if any) from transmitter 106 to provide the next carrier wave with the next channel.

Repeater 104 receives the amplified broadband RF signals from the receiver. Generally speaking, the repeater received data packets in frequency channels contain in a carrier wave at a certain carrier frequency and repeats some or all of those frequency channels on a carrier wave at a different carrier frequency. Which frequency channels are repeated depends in part on such factors as whether the data is being repeated to propagate upstream or downstream and whether this is a fully routed or switched network. Regardless, the central function of the repeater is to change the carrier frequency at each modem and to broadcast the carrier wave with sufficient power to reach the next modem. If the carrier frequencies are reused, the power level should dissipate before reaching the next modem that repeats frequency channels on the same carrier frequency.

In an embodiment, the repeater mixes the incoming carrier wave with a local oscillator signal to change the carrier frequency and strips off the frequency channel of interest for the receiver and sends the carrier wave at the new carrier frequency back out to the line. In fully routed network, if the frequency channel of interest is dropped at each modem/node, then only the unprocessed frequency channels are repeated on the carrier wave to propagate downstream to the remaining modems. In a switched network, the transmitter processes local end user changes to produce the modified frequency channel of interest, mixes that frequency channel up to the same new carrier frequency and combines the frequency channel with the other frequency channels in the carrier wave at the new carrier at the duplexer. In other situations, the modem may only repeat one or more of the unprocessed or processed frequency channels.

In an embodiment, a programmable carrier controller 152 selects a carrier frequency N and a frequency channel of interest N. Instructions may be pre-programmed or sent dynamically via a dedicated management channel to the Controller. A programmable local oscillator 154 generates a local oscillator signal corresponding to carrier frequency N and provides the local oscillator signal to an RF mixer 156. The output of the RF mixer will be equal to carrier frequency N upconverted by the step-size between carrier frequencies. A programmable RF filter 158 is tuned to remove the frequency channel of interest for the modem. A broadband RF amplifier 160 amplifies the carrier wave, which is passed through duplexer 150 to combine with the carrier wave from the repeater 104 (if any) to diplexer 107 and the broadband MV line coupler to propagate upstream or downstream. In the fully routed network, the frequency channel is dropped at each mode. In the switched network, end user modifications are incorporated in the frequency channel by the Transmitter and combined with the other N−1 channels via duplexer 150 into the carrier wave. In other situations, the RF filter could be programmed to remove other frequency channels as well, potentially all but a single unprocessed frequency channel to be repeated downstream. For signals propagating upstream towards the substation, the repeater mixes the carrier wave to the new carrier frequency and the transmitter inserts the local frequency channel of interest so that all N channels can be rebuilt and returned to the substation.

In an alternate embodiment, the repeater could be configured to strip all of the frequency channels off of the incoming carrier wave at the incoming carrier frequency and then modulate one or more of the frequency channels onto an outgoing carrier wave at the outgoing carrier frequency. Any frequency channels generated by the transmitter could be combined with these frequency channels on the outgoing carrier waves. Various techniques to demodulate the incoming carrier wave and frequency channels and re-modulate some or all of the frequency channels onto an outgoing carrier wave at a different carrier frequency are contemplated by the current invention.

Figure 8:
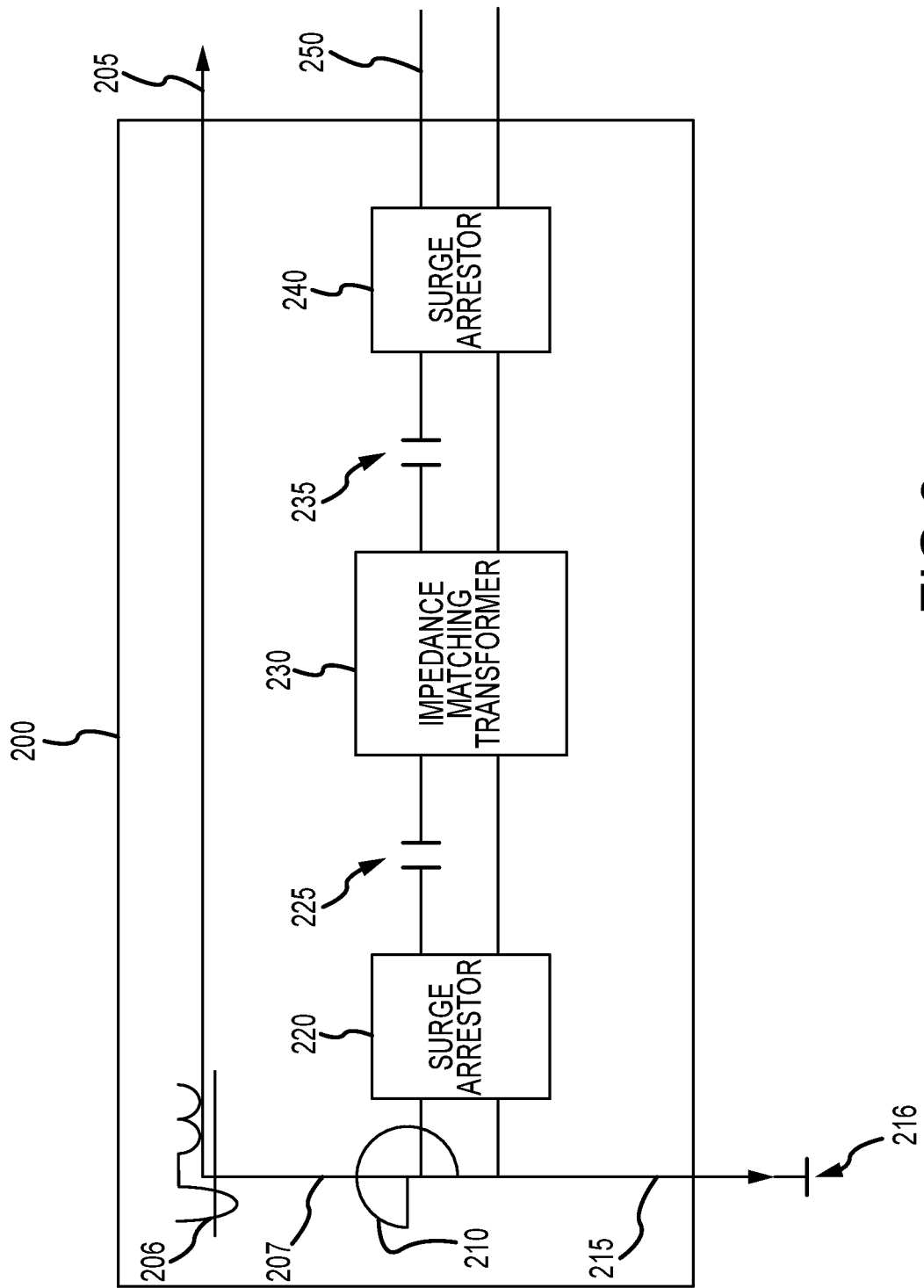
FIG. 8 is a diagram of an embodiment of a broadband power line coupler for a medium voltage power line.
Figure 9:
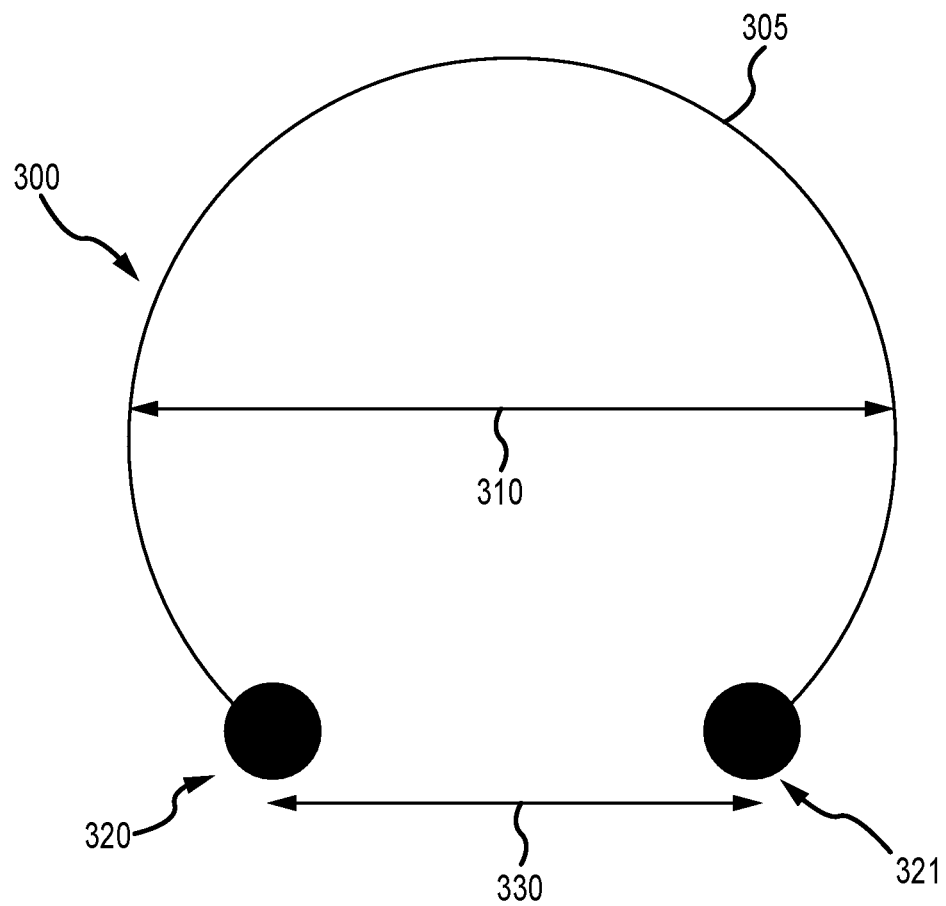
FIG. 9 is a diagram of an embodiment of choke for use in the broadband power line coupler.

Referring now to FIGS. 8 and 9, a broadband power line coupler for frequencies of 2 GHz and above comprises an impedance matching transformer, one or more series coupling capacitors, surge arrestors and a radio frequency choke. The choke has a low impedance at frequencies below 100 kHz for conducting lightning, switching, fault and other transient pulses to ground, while having an impedance of at least the same order of magnitude as a power line characteristic impedance, so as not to excessively attenuate power line data frequencies.

In an embodiment, a broadband power line coupler 200 connects to a neutral conductor 205 via clamp 206 and wire 207. Coupler 200 is connected to a safety ground 216 by a wire 215. A choke 210 has a low impedance for surge currents that typically have spectral energy extended up to a frequency in a range of 100 kHz, but an impedance in a range 20 to 400 ohms for frequencies exceeding 1 GHz. Choke 210 thus conducts surges harmlessly to ground while avoiding loading of power line communications signals from a modem to a power line and from a power line to a modem, in a range exceeding 1 GHz. Coupler 200 functions to carry signals from a BPL modem to the neutral conductor and from the neutral conductor to the modem through a port 250. Illustrating the former, a BPL modem (not shown) generates a radio frequency signal that passes through an optional surge arrestor 240, through an impedance-matching transformer 230, and surge arrestor 220, to neutral conductor 205. Series capacitors 235 and 225, act as high pass filters, passing signal frequencies and attenuating lower frequency spectral components of surge voltages.

Referring now to FIG. 9, an embodiment of a choke 300 is capable of high current conduction while providing a high impedance at GHz frequencies required for broadband coupling. A loop of wire 305 forms a single turn inductor having minimal stray capacitance and therefore a high self-resonant frequency (SRF). The loop may cover an arc of less than 360 degrees, to minimize stray capacitance between the ends. The wire has a diameter 310 in a range of 7 to 20 cm. Terminals 320 and 321 of choke 300 have a separation 330 of at least 3 cm.

In an alternate embodiment of the choke, a wire passes through one or more magnetic cores. The cores have a greatly reduced permeability ($\mu'$) at GHz frequencies but retain a significant loss permeability ($\mu''$). For purposes of the choke, a high impedance is necessary at a GHz signal frequency and can be obtained through either inductive reactance or loss impedance. Currently available magnetic materials have very low inductive permeability at GHz frequencies, but we propose exploiting their loss permeability that extends into the GHz range.

In both embodiments, the wire has a diameter and current carrying capacity to conduct a surge current induced in the power line by a proximate lightning strike.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for providing access Broadband over Power Line (BPL) communications over a power distribution system having a medium voltage power line including a conductor, a plurality of low voltage power lines extending to customer residences, and a first transformer coupling the medium voltage power line to the low voltage power lines, the system comprising:
   data packets in a plurality of N frequency channels contained in a first carrier wave at a carrier frequency A of at least 1 GHz propagating on the medium voltage power line conductor;
   one or more broadband power line couplers configured to extract and inject broadband data signals spanning a bandwidth of at least 1 GHz from and to the medium voltage power line conductor; and
   a modem connected to the one or more broadband power line couplers, said modem configured to extract the first carrier wave at carrier frequency A, extract and process a designated frequency channel from the first carrier wave to convert data packets to a distribution protocol that is coupled to the low voltage power lines and provided to the customer residences to bypass the first transformer, and to repeat at least one of the unprocessed frequency channels on a second carrier wave at a different carrier frequency B that is injected via the one or more broadband power line couplers back onto the medium voltage power line conductor.

2. The system of claim 1, wherein the N frequency channels occupy slices of the carrier wave from baseband up towards carrier frequency A.

3. The system of claim 1, wherein the N frequency channels include a first portion for downstream propagation and a second portion for upstream propagation.

4. The system of claim 1, wherein each of the N frequency channels has a bandwidth of at least 40 MHz.

5. The system of claim 1, wherein carrier frequency A is at least 1.5 GHz and each of the N frequency channels has a bandwidth of at least 80 MHz.

6. The system of claim 1, wherein the modem repeats all of the frequency channels on the carrier wave at carrier frequency B for downstream propagation.

7. The system of claim 1, wherein the modem repeats at least all of the unprocessed frequency channels on the carrier wave at carrier frequency B for downstream propagation.

8. The system of claim 1, wherein the modem comprises:
   one or more ports for connection to the one or more broadband power line couplers to receive and transmit broadband data signals of at least 1 GHz;
   a receiver configurable to extract the first carrier wave at carrier frequency A from a plurality of X different carrier frequencies, extract and process data packets in a routing protocol from the designated frequency channel from N frequency channels contained in the first carrier wave, and convert the data packets to the distribution protocol for delivery to customer residences; and
   a repeater that repeats at least the unprocessed frequency channels on the second carrier wave at carrier frequency B from one of the X carrier frequencies at one of the ports.

9. The system of claim 8, wherein the modem further comprises:
   a transmitter configured to receive data packets in the distribution protocol from the customer residences, decode the data packets to a routing protocol and modulates the data packets onto a third carrier wave at a designated channel frequency and a designated carrier frequency at one of the ports.

10. A system for providing access Broadband over Power Line (BPL) communications over a power distribution system having a medium voltage power line including a conductor, a plurality of low voltage power lines extending to customer residences, and N transformers coupling the medium voltage power line to different subsets of the low voltage power lines, the system comprising:
   data packets in a plurality of N frequency channels contained in a carrier wave at a carrier frequency of at least 1 GHz propagating on the medium voltage power line conductor;
   at each successive transformer,
      one or more broadband power line couplers configured to extract and inject broadband data signals spanning a bandwidth of at least 1 GHz from and to the medium voltage power line conductor; and a modem connected to the one or more broadband power line couplers, said modem configured to extract the carrier wave at the carrier frequency from the immediately preceding transformer, extract and process a designated frequency channel from the extracted carrier wave to convert data signals to a distribution protocol that is coupled to the low voltage power lines and provided to the customer residences to bypass the transformer, and to repeat at least one of the unprocessed frequency channels on a carrier wave at a carrier frequency of at least 1 GHz and different than at least the X previous carrier frequencies that is injected via the one or more broadband power line couplers back onto the medium voltage power line conductor to propagate downstream to the next transformer, said modem repeating the data signals on the carrier wave at a power level sufficient to reach the next transformer but not more than the next Y transformers where Y<=X.

11. The system of claim 10, wherein the modem is configured to select a carrier frequency from X different carrier frequencies where X<N/2 whereby each of the X carrier frequencies is reused at least once to service the N transformers.

12. The system of claim 10, wherein the N frequency channels occupy slices of the carrier wave from baseband up to the lowest carrier frequency.

13. The system of claim 10, wherein each of the different carrier frequencies is at least 1.5 GHz and each of the N frequency channels has a bandwidth of at least 80 MHz.

14. The system of claim 10, wherein the modem repeats all of the frequency channels on the carrier wave for downstream propagation.

15. The system of claim 10, wherein the modem repeats at least all of the unprocessed frequency channels on the carrier wave for downstream propagation.

16. The system of claim 10, wherein the modem is further configured to receive modified data packets in the distribution protocol from the customer residences, decode the data packets to a routing protocol and modulate the data packets onto a carrier wave at a designated channel frequency and a designated carrier frequency at one of the ports.

17. The system of claim 16, wherein as the modified data packets move upstream at each successive transformer, each successive modem is configured to add the modified data packets at its designated channel frequency to the carrier wave at a different carrier frequency to eventually rebuild all of the N frequency channels on the carrier wave.

18. A method from providing access Broadband over Power Line (BPL) communications over a power distribution system having a medium voltage power line conductor, a plurality of low voltage power lines extending to customer residences, and N transformers coupling the medium voltage power line to different subsets of the low voltage power lines, the system comprising:

injecting data packets in a plurality of N frequency channels contained in a carrier wave at a carrier frequency of at least 1 GHz propagating on the medium voltage power line conductor;

at each successive transformer,
coupling broadband data signals spanning a bandwidth of at least 1 GHz from the medium voltage power line conductor;

extracting a carrier wave at the carrier frequency generated by the immediately preceding transformer;

extracting and processing a designated frequency channel from the extracted carrier wave to convert the data signals to a distribution protocol;

coupling the data signals in the distribution protocol to the low voltage power lines and to the customer residences to bypass the transformer;

repeating at least one of the unprocessed frequency channels on a carrier wave at a carrier frequency of at least 1 GHz and different than at least the X previous carrier frequencies at a power level sufficient to reach the next transformer but not more than the next Y transformers where Y<=X; and coupling the carrier wave back onto the medium voltage power line conductor to propagate downstream to the next transformer.

19. The method of claim 18, wherein the step of repeating at least the unprocessed frequency channels comprises selecting the carrier frequency from X different carrier frequencies where X<N/2 whereby each of the X carrier frequencies is reused at least once to service the N transformers.

20. The method of claim 18, wherein the N frequency channels occupy slices of the carrier wave from baseband up to the lowest carrier frequency.

21. The method of claim 18, wherein each of the different carrier frequencies is at least 1.5 GHz and each of the N frequency channels has a bandwidth of at least 80 MHz.

22. The method of claim 18, wherein the step of repeating at least one of the unprocessed frequency channels comprises repeating all of the frequency channels on the carrier wave for downstream propagation.

23. The method of claim 18, wherein the step of repeating at least one of the unprocessed frequency channels comprises repeating at least all of the unprocessed frequency channels on the carrier wave for downstream propagation.

24. The method of claim 18, at each successive transformer, further comprising:

receiving modified data packets in the distribution protocol from the customer residences, decoding the data packets to a routing protocol; and modulating the data packets onto a carrier wave at a designated channel frequency and a designated carrier frequency.

25. The method of claim 24, wherein as the modified data packets move upstream at each successive transformer, further comprising adding the modified data packets at the designated channel frequency for the transformer to the carrier wave at a different carrier frequency than the previous transformer to eventually rebuild all of the N frequency channels on the carrier wave.

26. A modem for use in providing Broadband over Power Line (BPL) communications in a power distribution system, said modem comprising:

one or more ports for connection to one or more broadband power line couplers to receive and transmit broadband data signals of at least 1 GHz;

a receiver configurable to extract a carrier wave at a particular carrier frequency of at least 1 GHz from a plurality of X different carrier frequencies, extract and process data packets from a designated frequency channel from N frequency channels contained in the carrier wave, and convert the data packets to a distribution protocol for delivery to customer residences; and a repeater that repeats at least one of the unprocessed frequency channels on a carrier wave at a different one of the X carrier frequencies at one of the ports.

27. The modem of claim 26, wherein $X<=N/2$.

28. The modem of claim 26, wherein the receiver is configurable to select the particular carrier frequency and designated frequency channel and the repeater is configurable to select the at least one unprocessed frequency channels and the different one of the X carrier frequencies.

29. The modem of claim 26, wherein the repeater repeats all of the frequency channels on the carrier wave for downstream propagation.

30. The modem of claim 26, wherein the repeater repeats at least all of the unprocessed frequency channels on the carrier wave for downstream propagation.

31. The modem of claim 26, further comprising:
a transmitter configured to receive data packets in the distribution protocol from the customer residences, decode the data packets to a routing protocol and modulate the data packets onto a third carrier wave at a designated channel frequency and a designated carrier frequency at one of the ports.

* * * * *